July 22, 1958     F. A. SHELDON     2,844,547
AQUEOUS TEXTILE PRINTING EXTENDERS COMPRISING A
GALACTOMANNAN, A WATER SOLUBLE FERROUS
SALT, METHOD OF PREPARING AND TEXTILE
FABRIC TREATED THEREWITH
Filed April 4, 1956
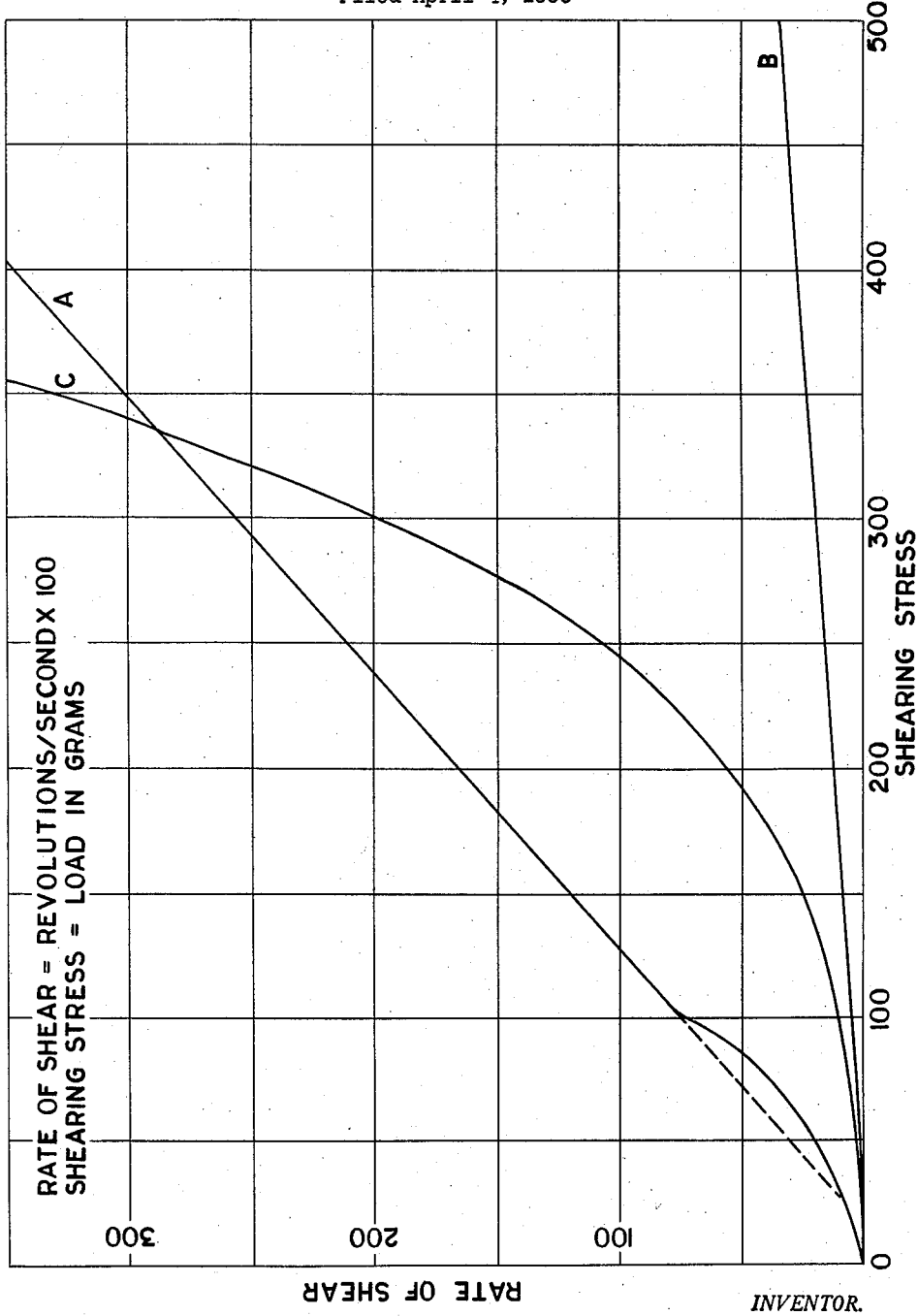
INVENTOR.
FRANK A. SHELDON
BY
ATTORNEY

United States Patent Office 2,844,547
Patented July 22, 1958

2,844,547

AQUEOUS TEXTILE PRINTING EXTENDERS COMPRISING A GALACTOMANNAN, A WATER SOLUBLE FERROUS SALT, METHOD OF PREPARING AND TEXTILE FABRIC TREATED THEREWITH

Frank A. Sheldon, Magnolia, N. J., assignor to The Sherwin-Williams Company, Cleveland, Ohio, a corporation of Ohio Application April 4, 1956, Serial No. 576,154

12 Claims. (Cl. 260—17.3)

This invention relates to compositions useful in the textile decorating art. More particularly, this invention is concerned with extenders for concentrated textile printing compositions of the "water phase" type.

Many of the successful pigment printing paste compositions are of the water-in-oil type which may be thickened by the addition of water or thinned by the addition of a diluent or solvent for the external phase, e. g., a hydrocarbon solvent. The difficulties inherent in compositions in which the external phase is organic include inflammability, and difficulty in cleaning the apparatus when it becomes necessary to change colors. Because of these disadvantages the effort has been to develop water phase printing pastes in which water is the external phase and the organic material is stably dispersed therein. A principal difficulty with these compositions, however, is the relatively high cost of what are known as "extenders." These compositions are frequently emulsions of water and organic material, usually a resin-hydrocarbon mixture together with suitable emulsifying agents. One of the drawbacks of these compositions is that the physical compositions thereof are such that when a color concentrate of the oil-in-water type is admixed with such an "extender," there is a viscosity loss which is too much in the extremely concentrated compositions for satisfactory printing purposes. It is, therefore, necessary to add certain thickeners, such as, methyl cellulose. The compositions are expensive and are not entirely satisfactory.

Another difficulty with prior extenders is their inability to tolerate electrolytes which are often times added to control the cure of resins contained in the printing paste.

It is a principal object of this invention to provide a composition of matter suitable for use as an extender in water phase (oil-in-water emulsion) printing pastes.

Another object is to provide an extender for pigment printing pastes useful either in the form emulsified with a normally liquid hydrocarbon or in the non-emulsified aqueous dispersion form.

Another object is to provide an extender which has improved tolerance for electrolytes.

Other objects of this invention will appear as the description proceeds.

It has been found that certain water dispersible gums may, by suitable formulation, hereinafter more fully disclosed, be rendered extremely useful in the production of extenders for oil-in-water emulsion type printing pastes. These gums when dispersed in water exhibit a pseudoplastic flow property. A substance that exhibits this property flows more readily when stirred or sheared, but there is no reversible structural breakdown as found in thixotropic flow. When very small percentages of these gums are dispersed in water, extremely high viscosities are obtained. However, when the dispersions are prepared as hereinafter described, near Newtonian behavior is secured, the viscosities are very much lower, and the compositions become useful in the textile printing art.

Broadly stated, therefore, this invention comprises the provision of a composition of matter of particular utility as an extender for water phase textile printing pastes, which composition comprises an aqueous dispersion of a water dispersible galactomannan produced from seed endosperms of the plant family Leguminosae, said aqueous dispersion containing from about 2% to about 8% by weight of said galactomannan and from about 0.4% to about 10% by weight of the dry galactomannan of a water-soluble ferrous salt. These aqueous dispersions may also have a hydrocarbon dispersed or emulsified therein as an internal phase.

The annexed drawing shows the behavior of typical aqueous compositions produced in accordance with this invention and compared with an untreated galactomannan solution. The graph represents a plot of the rate of shear in revolutions per second×100 against the shearing stress in grams. The curves identified as A and B represent compositions produced in accordance with this invention. The curve identified as C represents an untreated solution or dispersion and demonstrates the non-Newtonian or pseudoplastic characteristics of such untreated compositions.

It has been found that water dispersions of galactomannans, e. g., Guar gum, lucust bean gum and other gums derived from seed endosperms of the Leguminosae family, may be rendered useful as extender compositions by treatment with ferrous iron in the presence of heat or, more desirably in the presence of a sequestering agent. The sequestering agent seems to enhance the activity of the iron so that the characteristics of the aqueous dispersion are altered. There is obtained a great reduction in the viscosity of very dilute compositions and the behavior of those compositions becomes almost Newtonian. Specific examples of sequestering agents which seem to take the place of heating include the water-soluble alkali metal and ammonium polyphosphates, such as, sodium, potassium, lithium and ammonium tetraphosphates, the alkali metal and ammonium Versenes, and the alkali metal and ammonium gluconates. Thus, the sequestering or chelating agents for ferrous iron appear to be the full equivalent of heating a chelating agent-free composition in the presence of ferrous iron.

The ferrous salts which may be used in accordance with this invention comprise any of inorganic water-soluble ferrous compounds, e. g., ferrous sulphate, ferrous ammonium sulphate, ferrous acetate, ferrous oxalate, etc.

One of the most readily available of the galactomannans is Guar gum. Two to three weight percent water dispersions of this gum are highly desirable as water phase printing paste extenders because of high color yield, high viscosity at low concentration, excellent wash fastness, low cost and wide pH range tolerance. The disadvantages of Guar gum include the formation of speckled dots of color in the printed area about 100% stronger than the rest of the print, which, for convenience, are referred to as Guar spots. These compositions also have a strongly gellatinous body and film-forming properties which cause "skinning" and which produce a harsh "hand" on the printed goods.

Although emulsification of a hydrocarbon, such as, mineral spirits, into the aqueous Guar dispersion improved the body and the "hand" of the print, nevertheless a simple aqueous emulsion still exhibited "Guar spots." Quite by accident it was found that when the Guar dispersions were heated in iron vessels for periods exceeding 1 hour, the viscosity was greatly reduced and the body improved tremendously. When a 3% Guar aqueous dispersion was heated in Pyrex for 5 hours and failed to show any improvement whatever, it appeared that the iron vessel was a responsible factor. Since iron in the elemental state is a reducing agent, ferrous salts were tried for the addition to the Guar dispersion. This gave the same effect as cooking for a long period in an iron vessel. Ferric salts showed no effect at all.

Further investigation showed that chelating agents of the polyphosphate type or the Versene type tremendously increased the effect of the ferrous salt permitting as little as 0.5% ferrous sulphate based on the dry weight of Guar to be used to improve the body.

Water soluble stannous salts, e. g., stannous chloride, exhibit a similar effect to that of the ferrous salts.

It is interesting to compare the Brookfield synchroelectric viscosities (#6 spindle at 10 R. P. M. 70° F.).

TABLE I

| | Cps. |
|---|---|
| 3% aqueous dispersion of gum Guar | [2] 125,600 |
| 2% aqueous dispersion of gum Guar | 41,000 |
| 3% aqueous dispersion of gum Guar with 0.2% FeSO$_4$ | 50,000 |
| 3% aqueous dispersion of gum Guar 0.2% FeSO$_4$, 0.1% Quadrafos [1] | 15,300 |
| 3% aqueous dispersion of gum Guar 0.1% FeSO$_4$ | 55,000 |
| 3% aqueous dispersion of gum Guar 0.1% FeSO$_4$+0.1% Quadrafos | 14,400 |
| 3% aqueous dispersion of gum Guar 0.1% FeSO$_4$, 0.1% EDTA [3] | 11,500 |

[1] Quadrafos—sodium tetraphosphate.
[2] #7 spindle used.
[3] Sodium Versene (sodium salt of ethylene diamine tetraacetic acid).

Where more than one component is listed, materials were added in the order in which they are listed.

It has been found that these compositions are more readily prepared and handled if a non-ionic emulsifier having an HLB number in the range of 8–12 is included in the composition. Hydrophilic agents tend to favor the production of oil-in-water emulsions. Principal among the non-ionics are the polyoxyalkylene materials built upon polymerized alkylene oxides, e. g., ethylene oxide. Various non-ionics are obtained by figuratively replacing a terminal H atom with R—, RCOO—, or HO—R— wherein R is aliphatic, cycloaliphatic, aromatic and alkyl substituted aromatic. The selection of R is dependent to a large extent upon the degree of organic solubility desired. Contrarily, the higher the polymer of the alkylene oxide, the better the water solubility. Specific examples of non-ionic emulsifiers include nonaethylene glycol mono-oleate, decaethylene glycol monolaurate, monosorbitan nonaethylene glycol, monolauroxy nonaethylene glycol, phenoxy nonaethylene glycol, mono-(capryl phenoxy)nonaethylene glycol, cyclohexoxy actaethylene glycol. Other non-ionics or mixtures thereof having an HLB value within the range above stated may be used. (For details of "HLB" method see J. Soc. Cosmetic Chemists, 1, 311 (1949).)

Generally speaking, the amount of galactomannan ranges from about 1% to about 8% by weight of the aqueous medium. It is of interest to note that heretofore, the maximum amount of Guar which could be dispersed in water was about 2.5% before the viscosity became so great that the material could not be handled. Galactomannans typified by Guar, locust beam, alfalfa, clover and fenugreek may be used in these concentrations.

The amount of water-soluble ferrous salt ranges from about 0.4% to about 10% by weight of the dry galactomannan, or from about .004% to about 1% by weight of the composition.

The chelating agent, where used, is ordinarily present in an amount which exceeds an amount stoichiometrically equivalent to the iron.

When a non-ionic emulsifying agent is used to facilitate emulsification with a hydrocarbon solvent, this usually amounts to from about 50% to 150% by weight of the dry galactomannan, or from about 0.5% to about 12% by weight of the composition.

Where a hydrocarbon emulsion is to be made, the amount of hydrocarbon is approximately equal to or less than the amount of water. Specific examples of hydrocarbons useful in accordance herewith include aliphatic and aromatic hydrocarbons, boiling in the range of about 122° F. to 526° F., such as the petroleum naphthas, mineral spirits, xylol, benzene, toluene, hexane, heptane, octane, cyclohexane, styrene, vinyl toluene, etc., such as commonly used in the textile finishing art.

Experience has shown that the most effective way of altering the galactomannan is by adding the sequestering agent to the water, allowing it to dissolve, adding the water-soluble ferrous salt, and finally adding the galactomannan. Guar, normally unmanageably viscous in 2.5% solution, has been prepared in concentrations up to 8% by using a ferrous sulphate concentration of 3.7% based on the dry weight of Guar. This solution had a viscosity of 89,000 cps.

The extenders utilizing Guar as the galactomannan are of two general groups; namely, oil-in-water emulsions which give bright prints and impart a soft "hand" to the goods and water dispersions which give prints less bright and produce a "boardy" effect which must be removed by subsequent soaping.

In the annexed drawing, the three curves shown represent plots of the rate of shear against the shearing stress for three different compositions. The composition yielding the curve identified as A is a 3% Guar dispersion containing 0.1% ferrous sulphate and 0.1% sodium tetraphosphate. The composition yielding the curve identified as B is a 3% Guar dispersion containing .015% ferrous sulphate and .030% sodium tetraphosphate. The composition yielding the curve identified as C is an otherwise untreated 1% Guar dispersion. The substantially straight line behavior of curves A and B is typical of Newtonian compositions and the behavior of the curve C is typical of pseudoplastic materials.

The oil-in-water emulsion extender may be prepared using a concentrate which contains Guar, ferrous sulphate, sodium tetraphosphate and Triton X–100 (a polyoxyethylene ethyl alcohol ether of an alkyl ($C_8$) substituted phenol).

In another embodiment the aqueous dispersion hereof may be reduced to dryness by evaporating the water content over mild heat not to exceed about 175° F. The dry material may then be reduced to a powder which on dispersion in water has the same excellent rheological properties as the freshly prepared dispersion.

It becomes convenient at this point to illustrate compositions produced in accordance with this invention and compositions utilizing the compositions hereof in printing pastes. It is understood that these examples are for illustrative purposes only, numerous other examples becoming readily apparent to those skilled in the art. It is not intended, therefore, to limit the scope of this invention to the examples set forth below.

Example 1

A typical formula for a concentrate is as follows:

| | Parts by weight |
|---|---|
| Gum Guar | 532 |
| Triton X–100 | 450 |
| Ferrous sulphate | 8 |
| Sodium tetraphosphate | 10 |

Example 2

| Oil-in-water emulsion extender: | Parts by weight |
|---|---|
| Water—120–140° F | 485 |
| Concentrate of Example 1 | 30 |
| Mineral spirits | 485 |

Example 3

| Non-emulsified extender: | Parts by weight |
|---|---|
| Water | 969.1 |
| Sodium tetraphosphate | .6 |
| Ferrous sulphate | .3 |
| Gum Guar | 30 |

Example 4

| Concentrate: | Parts by weight |
|---|---|
| Locust bean gum | 500 |
| Triton X-100 | 480 |
| Ferrous sulphate | 10 |
| Sodium tetraphosphate | 10 |

Example 5

| Oil-in-water emulsion extender: | Parts by weight |
|---|---|
| Water (120–140° F.) | 485 |
| Concentrate of Example 4 | 30 |
| Mineral spirits | 485 |

Example 6

| Oil-in-water emulsion extender: | Parts by weight |
|---|---|
| Gum Guar | 15 |
| Triton X-100 | 14 |
| Ferrous sulphate | 0.5 |
| Sodium tetraphosphate | 0.5 |
| Water | 470 |
| Mineral spirits | 500 |

Example 7

The composition of Example 6 was reproduced using sodium Versene as the sequestering or chelating agent. As in Example 6, the ingredients were mixed and vigorously agitated on an Eppenbach homogenizer.

Example 8

This illustrates the preparation of a dry powder which may be re-dispersed in water. It will exhibit the same rheological properties as the freshly prepared aqueous dispersion or emulsion. The following materials were mixed together in the order named utilizing a high speed Eppenbach homogenizer.

| | Parts by weight |
|---|---|
| Water (140° F.) | 3877 |
| Sodium tetraphosphate | 2 |
| Ferrous sulphate | 1 |
| Gum Guar | 120 |

The materials are allowed to mix for 30 minutes.

The resulting dispersion was evaporated to dryness at 120° F. and the resultant solids pulverized. Flash drying at higher temperatures can be used if the duration of exposure is insufficient to cause dextrinization of the galactomannan.

The powder is readily dispersible in water and yields dispersions having excellent flow. These aqueous dispersions may be used in formulations as hereinafter more particularly pointed out without emulsification.

If desired, an emulsion extender may be prepared by adding to the dispersion an emulsifier of a non-ionic type such as Triton X-100 and mineral spirits with vigorous agitation.

In all of these formulas, the materials are added in the order listed with vigorous agitation from a homogenizing mixer (Eppenbach).

The compositions of this invention are useful with printing pastes, examples of which follow for illustrative purposes.

Example 9

PART 1

450 grams of copper phthalocyanine blue press cake (100 grams of dry pigment) are flushed into 163 grams of butylated melamine-formaldehyde resin, and 294 grams of water are separated and removed as a result of the flushing. The resin is composed of 50 parts of melamine-formaldehyde resin, 30 parts of butyl alcohol and 20 parts of xylene. The resin alone might be used or other resins such as urea-formaldehyde, or other such urea-aldehyde type resins.

In a separate vessel, 157 grams of the same melamine-formaldehyde resin, 330 grams of a petroleum hydrocarbon having a boiling range of 154° to 194° C., 150 grams of ethyl cellulose (10 cps. Standard ethoxy) are mixed until the ethyl cellulose is dissolved. A cloudy, thick liquid is produced.

The contents of the separate vessels are then mixed together and roller milled until the product has a smooth consistency.

To every five parts of this product is added and thoroughly mixed one part of an emulsifier, such as, the various polyethylene oxide condensation products, sorbitan mono-oleate polyoxyalkylene derivatives, triethanolamine oleate, or the like, followed by the gradual addition of five parts of water.

This product is a concentrated lacquer-in-water type textile finishing composition.

PART 2

To produce a let down printing composition, one part of the foregoing color concentrate may then be admixed by simple stirring with one part of the extender described in Example 2 above to produce a very deep shade of blue. If a lighter shade of blue is desired, the amount of extender may be increased to as much as 100 parts or more per part of the concentrated blue color. At a ratio of 100:1, for example, the aqueous dispersion of Example 3 may be used.

Example 10

PART 1

A concentrated green textile printing paste is made according to the following formula and steps: 233 grams of a press cake of the iron salt of nitrosobetanaphthol (100 grams of dry pigment), and 100 grams of water are mixed to a smooth paste. To this are added 175 grams of the same melamine-formaldehyde resin used in Example 9 above. The ingredients are mixed and the pigment flushed into the organic phase with the removal of 80 grams of water. There are then added an additional 25 grams of the melamine-formaldehyde resin and 297 grams of turpentine. This composition is passed through a colloid mill.

530 grams of the paste prepared above are mixed with 35 grams of oleic acid, 143 grams of melamine-formaldehyde resin (as above), 143 grams of 25% ethyl cellulose solution (10 cps. Standard ethoxy), 35 grams of octyl alcohol and 114 grams of 65% bis-(2-ethyl hexyl) sodium sulphosuccinate in butyl Cellosolve (monobutyl ether of ethylene glycol).

Neither the oleic acid nor the octyl alcohol is essential. The turpentine is present as a solvent for the melamine-formaldehyde resin. Other pigments and other solvents may be employed.

PART 2

The concentrated color thus produced may be extended with any of the foregoing extenders for example, in accordance with the following formula:

| | Parts |
|---|---|
| Green paste of Exemple 10 | 10 |
| Butadiene acrylonitrile latex (50% solids) | 10 |
| Extender (Example 5) | 90 |

Example 11

| | Grams |
|---|---|
| Lithosol violet (a water dispersed vat dyestuff paste) | 5 |
| Padding emulsion | 5 |
| Extender (Example 6 above) | 100 |

The padding emulsion referred to in this example had the following composition by weight:

| | Percent |
|---|---|
| Butylated melamine-formaldehyde resin | 16.3 |
| Butyl alcohol | 10.8 |
| Triton X-100 | 5.0 |
| Dibutyl phthalate | 2.5 |
| Ethyl cellulose (10 cps.) | 8.0 |
| Ammonia (28° Bé.) | 1.5 |
| Water | 55.9 |

These pastes may be printed by means of an intaglio engraved roll, a surface printing machine or by the silk screen method. Following printing, the decorated textile is dried and heated at an elevated temperature to obtain fastness.

Example 12

PART 1

In this example there was used a solvent-free solid form of butylated melamine-formaldehyde resin known as Resimene 888. The materials employed in making the color concentrate with brief indications as to the steps are as follows:

1,466 gms. of copper phthalocyanine blue press cake (300 gms. pigment)
150 gms. of a 50% aqueous solution of a sodium salt of a naphthalene sulphonic acid, formaldehyde condensation product (Blancol)
Mix to disperse 150 gms. monobutyl ether of etylene glycol  ⎫
240 gms. Resimene 888                        ⎬ Premix to dissolve
240 gms. dibutyl phthalate                   ⎭

Flush and remove 1273 gms. of water and monobutyl ether of ethylene glycol.
Add:
500 gms. of water
Wash and remove 544 gms. water.
150 gms. ethyl cellulose (10 cps. standard ethoxy).
Mix until dissolved
166 gms. oleic acid
83 gms. monoethanolamine
1425 gms. water
37 gms. ammonia (27% aqueous $NH_3$)

PART 2

The foregoing color concentrate may be let down with any of the extenders shown in the previous Examples 2 to 8 to yield any desired shade of blue. For example, blue may be produced in accordance with the following formula:

| | Parts |
|---|---|
| Blue printing pastes as per this example | 1 |
| Extender (Example 5) | 100 |

The alkylated melamine-formaldehyde condensation products which are useful in forming these concentrated color pastes may be prepared by known methods. For example, reference may be had to the patent to Widmer, 2,197,357 and the patent to Swain, Re. 22,402. In general, these condensation products are prepared by reacting 2 to 6 mols of formaldehyde with 1 mol of melamine. The condensation product formed is believed to be mostly methylolmelamine.

When preparing the various alkylated melamine-formaldehyde condensation products, it is frequently desired to prepare first the methylated methylol-melamine and then, by an interchange process utilizing an aliphatic alcohol of the desired carbon atom content, e. g., 3 to 12 carbon atoms, obtain the corresponding "alkylated methylol melamine." Specific examples of such treatment are given in the patent to Johnstone et al., Re. 22,566.

In using the extenders of the present invention to produce the improved textile decorating compositions, the amount and kind of extender assumes some importance. The colors referred to herein are usually prepared in highly concentrated form. Generally, the textile printer will desire to "let down" the concentrated printing paste to give a lighter color. Most usually, the concentrated pigmented printing pastes of the oil-in-water type are cut with an extender in a weight ratio within the range of from about 1:1 to 1:100 or more. If the color desired by the printer is a deep shade, i. e., the dilution with extender is to be about 1:1 to 1:20, then best results are secured if the emulsion type extenders in the foregoing examples are used. It has been found that the substitution of the emulsion type extender for the aqueous dispersion type prevents too much bleeding through of color to the reverse side of the printed fabric. Also there is a tendency to smooth out the print and avoid a thready appearance.

If the color is to be very dilute, i. e., within the range of from 1:80 to 1:100 or more, then the non-emulsified aqueous extenders shown in the foregoing examples may be used. At the intermediate ratios, i. e., 1:20 to 1:80, either type of extender may be used.

The concentration of the galactomannan and the other ingredients in these extenders is extremely low. It will be appreciated, therefore, that tremendous viscosity increases are secured with extremely small amounts of material. Where the emulsion type of extender is used, the cost is considerably less than currently available extender compositions. The cost of the aqueous non-emulsion extenders is about ½ of the emulsion type extenders.

Further advantage of the compositions of the present invention concerns the amount of latex which may be added. Frequently such latices are added to these compositions to improve the resistance of the color on the fabric surface to removal by rubbing, i. e., "crock." Using the water phase system as improved in accordance with the present invention, almost any amount of latex, e. g., acrylonitrile-butadiene latex (40–60% solids) can be added. With the water-in-oil type of printing pastes, only a limited amount of such latex can be added.

There are some applications in textile printing where it is desirable to add an electrotype, such as ammonium sulphate or ammonium chloride or stannous chloride, as an acid releasing agent to act as a curing catalyst. There are also applications where it is necessary to add a reducing agent in order to destroy colors of the dye type which when used in conjunction with pigment colors might contaminate the shade of the pigment color by carrying over into the color box or by falling on top of a pigment color print.

The compositions of the present invention provide non-ionic extenders which provide required viscosities in low concentrations and at the same time tolerate the addition of electrolytes.

It is not intended to be bound by the theory by which the desirable rheological properties are conferred upon the compositions of this invention. The extreme viscosities of galactomannan aqueous dispersions are possibly due to some cross linking between the galactose units which appear to be side chains on a mannose base. The effect of ferrous iron or stannous tin seems to be that of inhibiting cross linking and the function of the chelating agent or heat seems to be to catalyze the inhibitory effect of the ferrous iron. Whether any chemical change occurs in these compositions or not is not known. The reversibility of these compositions from aqueous to dry to aqueous as exemplified by Example 8 herein would seem to indicate a physical modification or physico-chemical instead of a purely chemical alteration.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. A composition of matter comprising an aqueous dispersion of a water dispersible galactomannan produced from seed endosperms of the plant family Leguminosae, said aqueous dispersion containing from about 2% to about 8% by weight of said galactomannan, and also containing from about 0.4% to about 10% by weight of the dry galactomannan of a water-soluble ferrous salt.

2. A composition in accordance with claim 1 in which the galactomannan is locust bean gum.

3. A composition in accordance with claim 1 in which the ferrous salt is ferrous sulphate.

4. A composition of matter comprising an aqueous dispersion of a water dispersible galactomannan produced from seed endosperms of the plant family Leguminosae, said aqueous dispersion containing from about 2% to about 8% by weight of said galactomannan, from about 0.4% to about 10% by weight of the dry galactomannan of a water-soluble ferrous salt, and from about 0.1% to about 10% by weight of the dry galactomannan of a water-soluble chelating agent for iron selected from the group consisting of alkali metal polysulphates, ammonium polysulphates, alkali metal salts of ethylene diamine tetraacetic acid, the ammonium salt of ethylene diamine tetraacetic acid, alkali metal gluconates and ammonium gluconate.

5. A composition in accordance with claim 4 in which the water-soluble ferrous salt is ferrous sulphate and the chelating agent is sodium tetraphosphate.

6. A composition of matter comprising from about 2% to about 8% by weight of Guar gum dispersed in water, said aqueous dispersion also characterized by the presence therein of from about .4% to about 10% by weight of the dry Guar gum of a water-soluble ferrous salt, and from about 0.1% to about 10% by weight of the dry Guar gum of a water-soluble chelating agent for iron selected from the group consisting of alkali metal polysulphates, ammonium polysulphates, alkali metal salts of ethylene diamine tetraacetic acid, the ammonium salt of ethylene diamine tetraacetic acid, alkali metal gluconates and ammonium gluconate.

7. A composition of matter comprising a 3% aqueous dispersion of Guar gum, said aqueous composition being further characterized by the presence therein of .1% by weight of ferrous sulphate and 0.1% by weight of sodium tetraphosphate.

8. A composition of matter comprising an oil-in-water emulsion having as the internal phase a normally liquid hydrocarbon boiling in the range of from 122° F. to about 526° F., and the external phase comprising an aqueous dispersion of a water-dispersible galactomannan produced from seed endosperms of the plant family Leguminosae, said aqueous dispersion containing from about 2% to about 8% by weight of said galactomannan, and also containing from about 0.4% to about 10% by weight of the dry galactomannan of a water-soluble ferrous salt.

9. An emulsion having the following composition:

| | Parts by weight |
|---|---|
| Gum Guar | 15 |
| Ferrous sulphate | 0.5 |
| Sodium tetraphosphate | 0.5 |
| A polyoxyethylene ethyl alcohol ether of a $C_8$ substituted phenol | 14 |
| Water | 470 |
| Mineral spirits | 500 |

10. A textile printing paste comprising: (a) a concentrated color paste comprising an oil-in-water emulsion of a resin selected from the group consisting of melamine aldehyde resins and urea-aldehyde resins having dispersed therein a pigment, and (b) an extender comprising an aqueous dispersion of a water dispersible galactomannan produced from seed endosperms of the plant family Leguminosae, said aqueous dispersion containing from about 2% to about 8% by weight of said galactomannan, and also containing from about 0.4% to about 10% by weight of the dry galactomannan of a water-soluble ferrous salt.

11. A textile fabric having thereon the dried product of claim 10.

12. The method of making an extender for textile printing pastes which comprises admixing water at a temperature of from about 100 to 175° F., a water soluble ferrous salt, a water soluble chelating agent for iron selected from the group consisting of alkali metal polysulphates, ammonium polysulphates, alkali metal salts of ethylene diamine tetraacetic acid, the ammonium salt of ethylene diamine tetraacetic acid, alkali metal gluconates and ammonium gluconate, from about 2 to about 8 weight percent of a galactomannan, drying the solution, pulverizing the resultant solids, and subsequently re-dispersing the dried solids.

References Cited in the file of this patent

Haynes: "Chemical Trade Names and Commercial Synonyms," page 442, second edition (1955).

UNITED STATES PATENT OFFICE
CERTIFICATE OF CORRECTION

July 22, 1958

Patent No. 2,844,547

Frank A. Sheldon

It is hereby certified that error appears in the printed specification of the above numbered patent requiring correction and that the said Letters Patent should read as corrected below.

Column 9, lines 12 and 13, claim 4, line 28, claim 6, for "polysulphates, each occurrence, read -- polyphosphates --; column 10, lines 32 and 33, claim 12, for "polysulphates" read -- polyphosphates --; line 33, claim 12, for "polysulphates" read -- polyphosphates --.

Signed and sealed this 21st day of October 1958.

(SEAL)
Attest:

KARL H. AXLINE
Attesting Officer

ROBERT C. WATSON
Commissioner of Patents